United States Patent [19]

Martin

[11] 4,026,033
[45] May 31, 1977

[54] TELEPHONE HANDSET INDICIA HOLDER

[76] Inventor: Forrest D. Martin, 3106 Fairfax Ave., Clovis, Calif. 93612

[22] Filed: May 17, 1976

[21] Appl. No.: 686,699

[52] U.S. Cl. .............................................. 40/336
[51] Int. Cl.² ........................................ G09F 3/06
[58] Field of Search ............ 40/336, 337, 10 D, 16

[56] References Cited

UNITED STATES PATENTS

| | | | |
|---|---|---|---|
| 1,729,961 | 10/1929 | Partridge | 40/10 D X |
| 2,575,280 | 11/1951 | Long | 40/336 X |
| 2,984,922 | 5/1951 | Ladenburger | 40/16 R X |
| 3,335,510 | 8/1967 | Littler | 40/16 |
| 3,464,135 | 9/1969 | Eidenger | 40/159 |

*Primary Examiner*—Russell R. Kinsey
*Assistant Examiner*—Wenceslao J. Contreras
*Attorney, Agent, or Firm*—Huebner & Worrel

[57] ABSTRACT

For use with a telephone handset, a holder fitted to and clasping the handset, providing an envelope for sheet material bearing indicia, such as telephone numbers, to which visual reference can be made through the holder.

1 Claim, 4 Drawing Figures

TELEPHONE HANDSET INDICIA HOLDER

BACKGROUND OF THE INVENTION

1. Field of the Invention

The present invention relates to a telephone handset indicia holder, and more particularly to such a holder for presenting commonly used telephone numbers and the like for convenient reference.

2. Description of the Prior Art

There are, of course, many devices for making readily available telephone numbers that are needed frequently or in an emergency. These devices include sheets bearing the numbers, which sheets are provided with adhesive to adhere to the handset or surfaces nearby. Such devices are inconvenient to change and do not protect the sheets bearing the numbers.

Other devices include pads with pushbuttons adapted to make available alphabetically classified numbers. Such devices are relatively expensive, can be misplaced, and occupy space which otherwise can be available for other uses.

Further, in many emergencies, instant access to telephone numbers is imperative. In such emergencies numbers not displayed on the telephone itself may not be immediately available when needed.

SUMMARY OF THE INVENTION

Accordingly it is an object of the present invention to provide an improved holder for telephone numbers and the like.

Another object is to provide a device for displaying telephone numbers on a telephone handset where they are consistently and immediately available.

Another object is to provide a holder for telephone numbers needed for ready reference which is convenient to install and remove.

Another object is to provide a device for presenting telephone numbers for ready reference which uses otherwise unused space, allows sheets bearing the numbers to occupy the largest possible area on the telephone handset, protects these sheets from smudging and wear, and allows them to be conveniently replaced.

Still further objects and advantages are to provide improved elements and arrangements thereof in a holder which is economical, durable, dependable, and convenient.

DESCRIPTION OF THE PREFERRED EMBODIMENT

Figure 1:
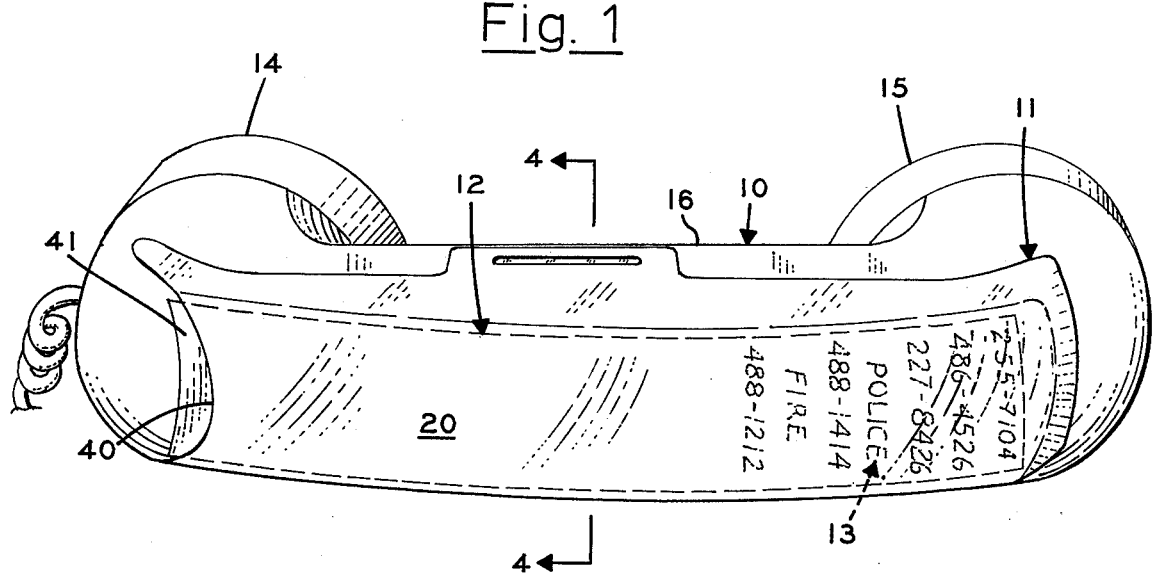
FIG. 1 is a perspective view of a telephone handset indicia holder embodying the principles of the present invention, showing the holder fitted to a telephone handset.
Figure 2:
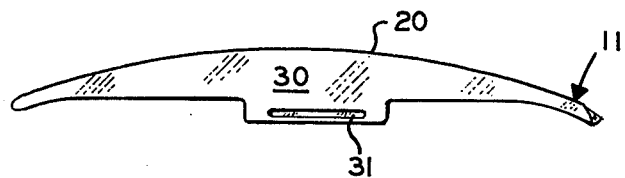
FIG. 2 is a side elevation of the holder of FIG. 1 at a somewhat reduced scale.

Refering more particularly to the drawings, in FIG. 1 is shown a telephone handset 10, fitted with an indicia holder 11 which embodies the principles of the present invention, through which may be seen a sheet or card 12 bearing indicia 13. The indicia may be emergency telephone numbers, frequently called telephone numbers, advertising or other intelligence as desired. As is well known, the handset has a transmitter or mouthpiece 14 and a receiver or earpiece 15 interconnected by a grip 16.

Figure 4:
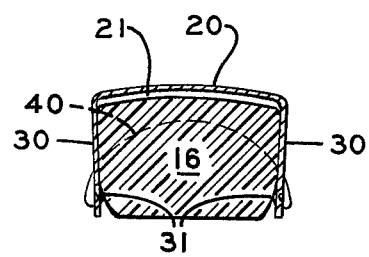
FIG. 4 is a transverse section of the holder and the grip at a somewhat enlarged scale taken on line 4—4 of FIG. 1.

The holder 11 has a unitary body of any suitable transparent sheet material, such as plastic, and is preferably cast or stamped rather than fabricated. The holder has a back 20 positioned on the back of the grip 16. The back of the grip is transversely substantially flat and longitudinally convex, as is well known in the art. The back 20 of the holder is a shape fitted to the back of the grip, but when the holder 11 is installed, the back of the holder is preferably substantially uniformly spaced from the back of the grip to define an envelope 21 therebetween, as shown in FIG. 4.

The holder 10 has opposite sides 30 integral with the back 20 spaced resiliently to clasp the grip 16. The sides bear inwardly disposed beads 30 which facilitate the clasping action.

Figure 3:
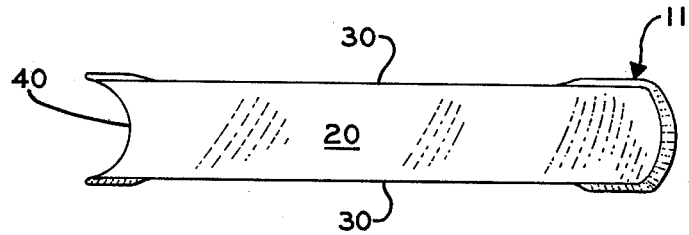
FIG. 3 is a plan view of the holder.

FIGS. 1 and 3 show an open end 40 of the holder 11 through which the sheet 12 may be slidably fitted into the envelope 21. The sheet may be of such length as to be completely overlaid by the holder, or as shown in FIG. 1, a portion 41 of the sheet may extend beyond the holder for grasping convenience. In either event, the longitudinal convexity of the grip 16 and back 20 assist in holding the sheet in place against inadvertent displacement.

OPERATION

The operation of the preferred embodiment of the present invention is believed to be clearly apparent and is briefly summarized at this point. The holder 11 is pressed onto the telephone handset 10 at the position shown in FIG. 1 so that the sides 30 resiliently clasp the grip 16 assisted by the beads 31.

The sheet 12, which has been previsouly prepared with the indicia 13, is then slid into the envelope 21 between the holder 11 and the grip 16. The sheet can be removed without disturbing the holder by pressing the portion 41 of the sheet against the handset and pushing the sheet to slide it from the envelope 21 or grasping the portion 41 and pulling the sheet from the envelope.

Alternatively, the sheet 12 can be installed or removed without sliding. With the holder 11 removed from the handset 10, the sheet can be placed on the back of the grip 16, and the holder pressed onto the grip at the position shown in FIG. 1. The sheet can also be removed from the grip by simply removing the holder first to release the sheet.

As will be evident, the emergency telephone numbers, the frequently called numbers and other information supplied by the indicia 13 are always immediately available and visible through the holder. Such information cannot be inadvertently misplaced without removal of the sheet 12. Such removal requires either that the sheet be slid from the envelope 21, or the holder 11 removed from the grip 16.

When additional numbers or other indicia 13 are to be placed on the sheet, it is quickly and easily removed and subsequently returned to place.

The holder 11 acts as a shield which protects the sheet 13 from smudging and wear. In use, the handset 10 is held in the usual way by grasping the grip 16 and the holder 11. The presence of the holder in no way interferes with normal usage.

The holder is economical to produce, durable, easily replaceable and fully effective in maintaining the indicia for immediate utilization.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and wish to protect by Letters Patent is:

1. In combination with a telephone handset having a mouthpiece, an ear piece and a grip interconnecting said pieces, said grip being characterized by a back surface of a transversely flat, longitudinally convex configuration and side edge surfaces of substantially planar configurations normally related to said back surface, a unitary indicia holder formed of a resilient, transparent material and supported in friction-fit engagement with said grip, comprising:

A. a back member of a transversely flat, longitudinally convex configuration uniformly spaced from the back surface of the grip for defining between the opposed surfaces of the back member and the back surface an envelope having a closed end and an open end;

B. a sheet bearing indicia disposed within said envelope;

C. means defining in said back member, in juxtaposition with the open end, an access relief of an arcuate configuration through which access to said sheet is afforded;

D. a pair of uniformly spaced side members of substantially planar configuration integrally related with said back member and extended in contiguous relation with the side edge surfaces of said grip; and E. clasping means for securing said holder in fixed relation with said grip including a pair of beads projected from the side members into an engaged relationship with the side edge surface of the grip.

* * * * *